Feb. 27, 1968 J. J. JACOBS ET AL 3,371,035
PLANT AND PROCESS FOR SEPARATION OF WATER
FROM AQUEOUS SOLUTIONS
Filed Dec. 22, 1961 3 Sheets-Sheet 1

Fig. 1a

INVENTORS
JOSEPH J. JACOBS
STANLEY L. KRUGMAN
JAMES K. BROOKS
By Fulwider Mattingly & Huntley
ATTORNEYS

Fig. 2

INVENTORS
JOSEPH J. JACOBS
STANLEY L. KRUGMAN
JAMES K. BROOKS

United States Patent Office 3,371,035
Patented Feb. 27, 1968

3,371,035
PLANT AND PROCESS FOR SEPARATION OF
WATER FROM AQUEOUS SOLUTIONS
Joseph J. Jacobs, Altadena, Stanley L. Krugman, Pasadena, and James K. Brooks, Glendora, Calif., assignors to Jacobs Engineering Co., Pasadena, Calif., a corporation of California
Filed Dec. 22, 1961, Ser. No. 161,577
32 Claims. (Cl. 210—59)

This invention relates to a method and means for treating aqueous solutions so as to separate the solvent from the solute therein. This invention is particularly adapted for the treatment of saline water solutions, e.g. sea water or brackish water, to obtain potable water therefrom.

While the problem of obtaining potable water from the sea is an old one (potable water being defined as about 500 p.p.m. or less of salt), and while a great number of proposals have been made in the art for solving the problem, a method and means has still not been devised which, to our knowledge, can economically produce potable water.

Obtaining potable water by freezing process is, of course, well known. Freezing is similar to distillation in that water, not salt, is separated from a saline solution. Theoretical thermodynamic considerations show freezing to be economically more attractive than either distillation or electrodialysis for treatment of sea water. In addition, other advantages of freezing reside in reduced corrosion and scaling due to the much lower operating temperature in equipment.

Thermodynamically, it appears that freezing offers a very large energy saving over distillation since distillation requires about 1000 B.t.u. for evaporation of a pound of water, while freezing requires only 144 B.t.u. per pound, the latent heat of fusion. Based on current distillation practice, however, this seven-fold advantage is not real since it is possible to reuse the heat of vaporization as many times as an economical temperature difference can be maintained through multistage evaporators. For instance, in certain multi-stage flash evaporation systems presently in operation, the water recovery is 6.2 pounds per pound of steam used. Thus, only 154 B.t.u. per pound of potable water is required. In freezing processes such multi-stage use of energy has not been employed. A means of temporarily depressing the freezing point of ice to create a temperature differential for multi-stage operation has not been devised prior to the present invention.

Freezing as a means of obtaining potable water has followed, to the present time, two main approaches—indirect freezing and direct freezing. Neither type of process has considered, in sufficient detail, the problem of occluded and adhering mother liquor to the ice crystals so formed.

The indirect freezing methods of the prior art have found that even with vigorous agitation, ice forms upon the heat transfer surfaces operating at a temperature below the freezing point of the saline solutions. This is apparently because of the low degree of supersaturation attainable. The ice formed reduces heat transfer, thus increasing the size of the freezing equipment and reducing the operating cycle before shutdown for ice removal.

Indirect freezing has been utilized in commercial ice machines in which the heat removed was transferred through the ice. These include can-ice, tube-ice, and flake-ice machines. The most successful of these is the tube-ice machine. Ice produced in this type of machine, however, must be recycled at least three times to produce water containing less than 500 parts per million of salt because of the occlusion and adherence of mother liquor. This occlusion and adherence of mother liquor is a problem that arises repeatedly in freezing work and has tended to obscure the theoretical advantages of this approach.

Direct freezing processes developed, to date, all produce very small ice crystals that are extremely difficult to separate efficiently from the adhered and occluded mother liquor. Overcoming this problem would greatly improve the economics of the direct freezing process, or any freezing process for that matter.

Bearing in mind the foregoing facts, it is a major object of the present invention to provide a novel apparatus and process whereby occlusion and adherence of mother liquor (containing salt) to solvent crystals are very substantially and significantly reduced.

Our process is based on the principles of crystallization and classification which show that large, uniform solvent crystals, e.g., ice or water-containing crystals, can be produced (with minimum effort and minimum loss of product) and separated if a sufficient degree of supersaturation is maintained with respect to ice or water-containing crystal formation. By application of relatively highly controlled supersaturated solution to grow such large crystals, a novel apparatus has been developed to provide crystal growth and classification. However, while our design provides the correct and ideal environment for growing large crystals and for efficient classification and washing of crystals, the ability to produce controlled supersaturation is an important dependent problem to that of proper crystallization techniques, and must also be solved in an economical manner.

It is therefore another major object of the present invention to provide a novel method and means for controllably supersaturating an aqueous salt solution such as a saline solution prior to crystallizing the solvent, such as ice or other water-containing crystals, e.g., $CO_2 \cdot 6H_2O$, from the solute brine.

It is practically impossible to attain controlled supersaturation, for aqueous solution, such as sea water, in indirect freezing processes, because a coating of ice tends to form on the heat transfer surfaces rather than as discrete crystals in the body of solution.

To overcome this aforementioned problem with an aqueous solution, such as sea water, some extraneous substance may be added in order to depress the freezing point analogous to producing the oversaturation of a salt in a water solution or, in some other manner, produce a high degree of supersaturation away from heat exchange surfaces. An alternate procedure involves the use of direct refrigeration by vaporization of a refrigerant in the liquid body, thereby eliminating heat exchange surfaces in contact with the brine but this will not depress the freezing point and therefore cannot give the supersaturation effect. In either manner, crystals would be formed and grown in suspension.

The use of a hydrate-forming gas such as $CO_2$ to first form a hydrate, under pressure, has been suggested as a means of separating water from aqueous mother liquor. However, to our knowledge, no one has suggested a feasible method and apparatus for employing the direct refrigerating effects obtainable by release of pressure on the hydrate, (1) to cause refrigeration by expansion of the hydrate-forming gas and (2) to cause refrigeration by the endothermic heat of dissociation of the hydrate. This dual role is accomplished in one embodiment of our process and is attributable to initial hydrate formation employing intermediate pressures, e.g. about 370 p.s.i.a. or lower.

Furthermore, as freezing proceeds by means of the refrigeration effect of the $CO_2$, as just described, large crystals may be grown where needed, because super-saturation is controlled due to the control exerted in the release of pressure on the hydrate-containing aqueous salt solution. Finally, by means of our novel apparatus, separation of the large crystals from the mother liquor is readily effected. In this way, a complete unique relatively inexpensive intermediate pressure system is provided for obtaining separation of water from aqueous mother liquor with minimum contamination.

The use of carbon dioxide has been found to be a preferred hydrate-forming gas. Carbon dioxide has relatively high solubility under pressure, is easily recoverable by pressure-shift, is inexpensively obtained from flue gases, and its presence in water is innocuous. In solution it forms either the monohydrate, the solid hexahydrate of $CO_2$ ($CO_2.6H_2O$) or other multiple solid hydrates, depending upon the pressure and temperature employed—with the evolution of heat.

Intermediate pressures, e.g., below about 370 p.s.i.a. and low temperatures (below 32° F.) cause formation of carbonic acid and supersaturation of the solution with respect to ice. Higher pressures, e.g., above 660 p.s.i.a. and temperatures below 52° F. cause formation of aqueous solution supersaturated with respect to solid hexahydrate crystals or other polyhydrate crystals.

By absorbing the carbon dioxide isothermally, with removal of the generated heat, e.g. by indirect ammonia refrigeration or by cooling with sea water, supersaturation of the aqueous solution with respect to ice or hexahydrate crystal formation is produced. Crystal growth in the intermediate pressure process is controlled when the hydrate of the carbon dioxide is dissociated by a controlled release of pressure. At the same time, substantial direct refrigeration is produced in the manner described above. In the high pressure process, crystal growth of hexahydrate crystals is controlled by means of the temperatures and pressures employed during absorption.

It will be appreciated that other water soluble gases can be employed in addition to carbon dioxide. For example, it is entirely possible that the apparatus and process of our invention can be employed with other water soluble gases which may or may not form solid hydrates such as hydrogen sulfide, hydrogen cyanide, sulphur dioxide, carbon monoxide or many other possible substances, under appropriate conditions of pressure and temperature.

We have discovered that it is important for the gas used to be soluble in water since we have found this to be necessary to reproduce depression of the freezing point of water and control supersaturation. We have further discovered that if, in addition, hydrates are formed, a unique countercurrent absorption-desorption process is possible wherein reuse of the refrigeration effect is obtained in an economic manner analogous to the reuse of heat in multi-effect evaporation.

The use of the combination of gas solubility in water and hydrate formation distinguishes our process from the use of the commonly known hydrocarbon hydrate formers. Our process is different from other uses of $CO_2$ and similar gases in that we combine controlled nucleation crystal growth, and a very economical multi-stage system which as far as we know has never been done before.

It is also apparent that our process and apparatus have many applications, e.g., in dehydration of juices, in solution mining, and in pharmaceuticals. Indeed or system has utility in any art requiring the separation of water from an aqueous solution. For clarity, however, we will direct the description first to the production of potable water from saline water by means of the production of the monohydrate, (carbonic acid) in an intermediate pressure process and second, to the production of a solid polyhydrate in a high pressure process.

Hydrate formation requires relatively high pressures for its production, e.g. 25 atmospheres or less for carbonic acid formation and about 44 atmospheres for hexahydrate formation. To obviate the compression of the total amount of carbon dioxide in process, it is another important object of our invention to provide novel and unique intermediate and high pressure systems of multi-stage, countercurrent, absorption (by the saline system), and desorption (from the saline system) of carbon dioxide or other suitable gas. The amount of carbon dioxide compressed to the highest pressure for absorption by the saline system is only a fraction of the total in process—being equal to the total amount divided by the number of stages of absorption and desorption.

These and other objects of our invention will become clearly understood with reference to the following description, and to the accompanying flowsheets in which:

FIGURE 1a and FIGURE 1b taken together comprise the complete flowsheet for one embodiment of our novel process.

In general, our intermediate and high pressure systems for obtaining potable water from saline water utilize carbon dioxide in the saline water and saline system to induce controlled supersaturation of ice or hexahydrate crystals, respectively, and thereby form large and uniform ice or hexahydrate crystals that can be separated and washed more efficiently than by any current method. These crystals are separated from mother liquor in a crystallizer-classifier of novel design to take advantage of the control of crystal growth made possible by the use of $CO_2$.

Figure 1A:
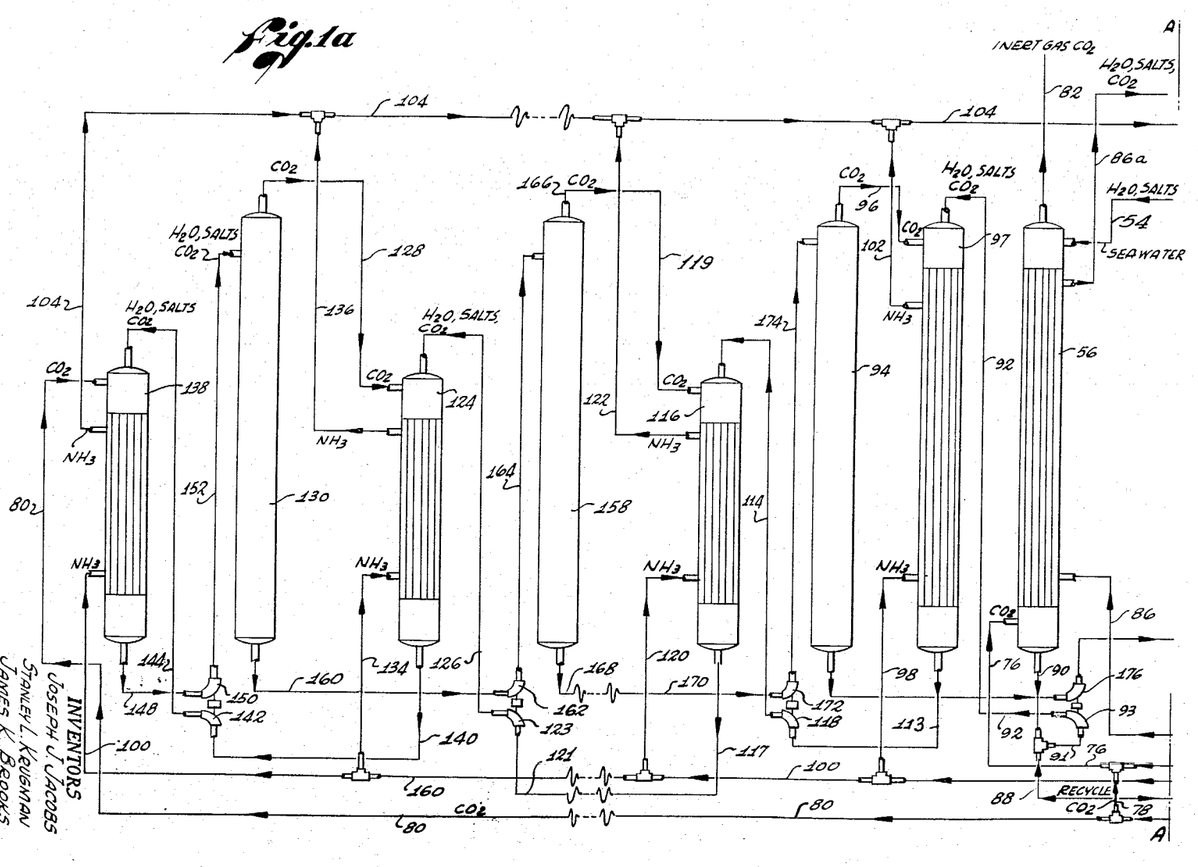
FIGURE 1a shows the multi-stage countercurrent absorption-desorption intermediate pressure system for compressing only a fraction of the total carbon dioxide in process, and FIGURE 2 comprises a second embodiment of our process employing high pressures for the production of solid hexahydrate crystals, a crystallizer of our novel design, a novel refrigerant system, and a multi-stage countercurrent absorption-desorption system for compressing only a fraction of the total carbon dioxide in process.
Figure 1C:
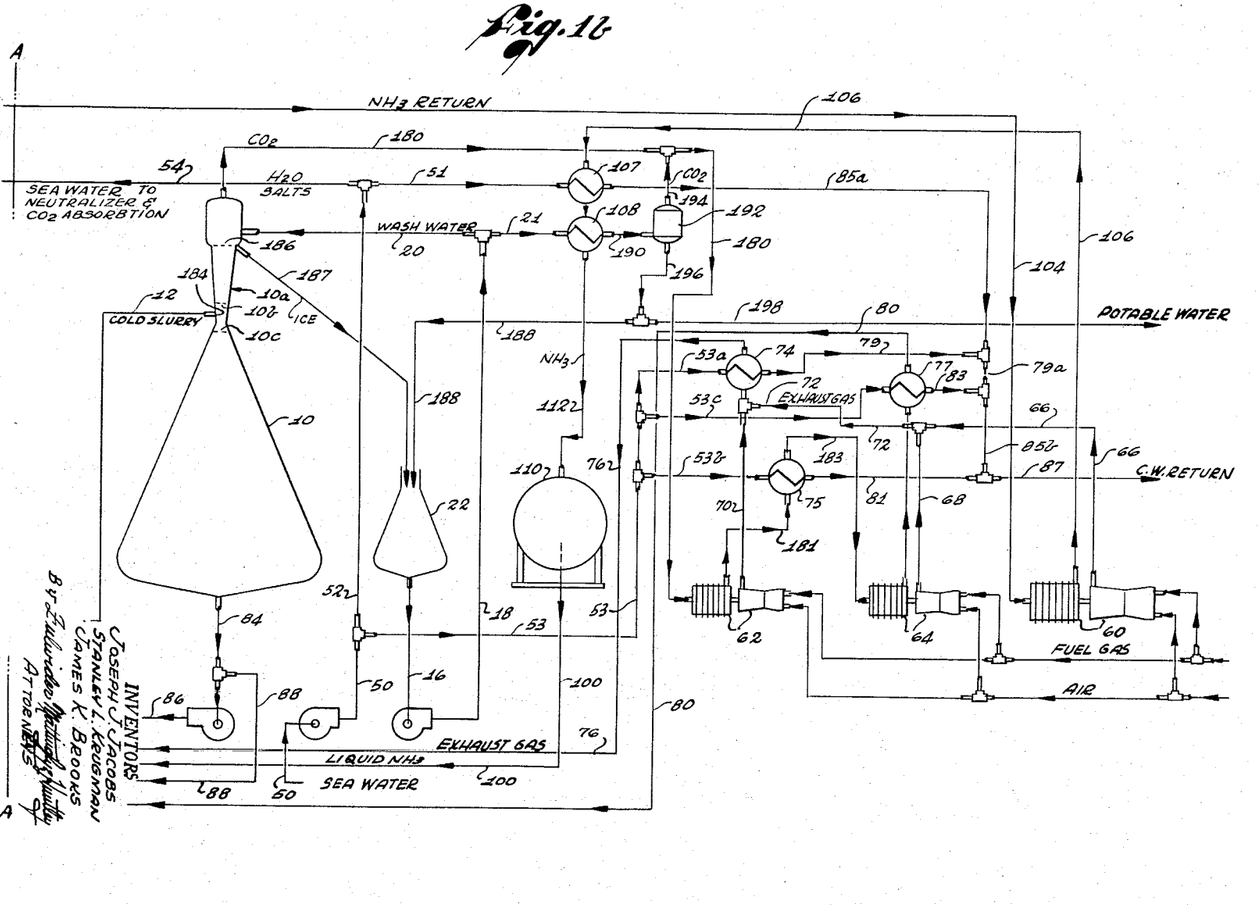
FIGURE 1b shows the crystallizer and ice melter of our novel design, an ammonia refrigerant system, and our carbon dioxide compressor system.
Figure 2:
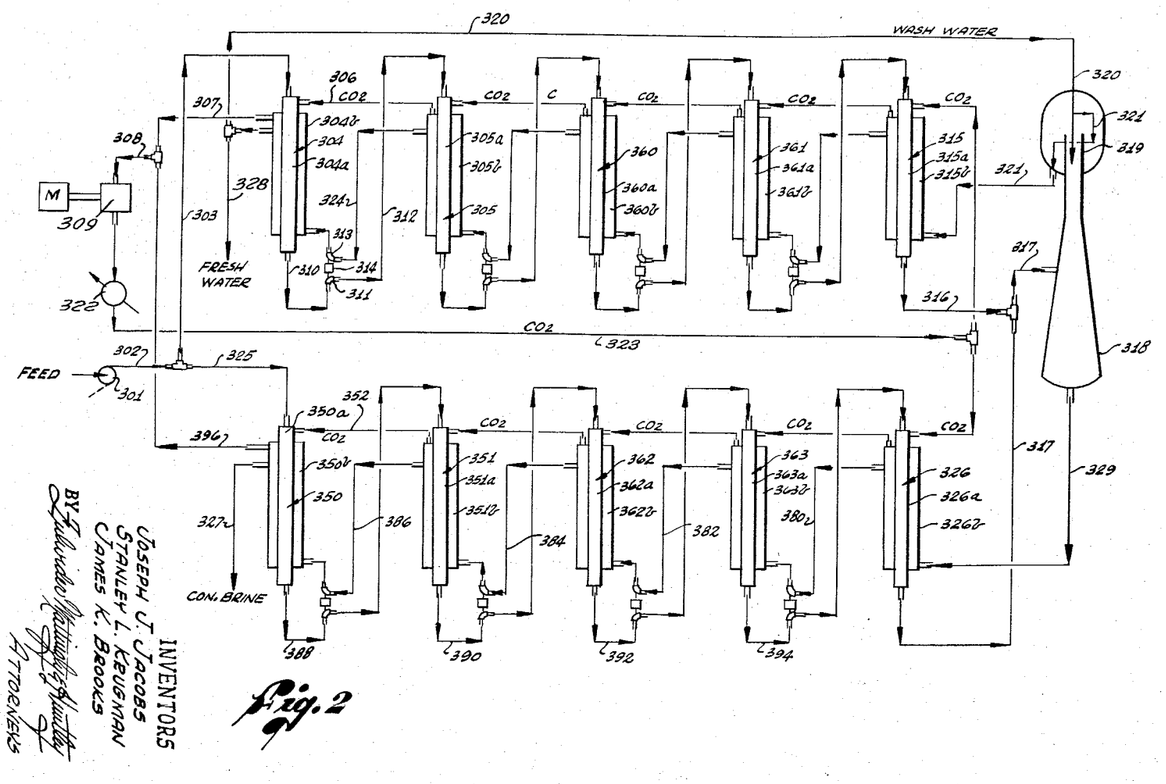

Further, our plant and process can be used to reduce actual energy requirements from the theoretical heat of fusion of ice of 143 B.t.u. per pound, in an analogous manner to that by which the 970 B.t.u. per pound heat of vaporization of water can be reduced in a multi-stage distillation process. The mechanism for accomplishing this is an intermediate or high pressure, multi-stage, countercurrent, absorption and desorption (freezing) process. (FIGURE 1a and FIGURE 2 respectively.) This represents a major breakthrough in the development of a freezing process, since heretofore the latter was limited to a single stage economy where the energy requirements were no lower than for an efficient distillation process, even though the heat of fusion is about one-seventh that of the heat of vaporization.

Also, our process, employing these novel concepts, has a lower cost potential than any which has been heretofore proposed.

Since our process is based on methods and means for obtaining large water-containing crystals (i.e., either ice or a multihydrate of $CO_2$), and then for their separation or classification, the classifier design is first discussed, together with crystallization concepts. The method and means for economically producing controlled supersaturation of crystals is set out in a separate section.

*Crystallization and classifier design*

The basic problem in any crystallizer designed to produce large crystals is to cool the solution below equilibrium temperature and then to induce the solute to crystallize upon existing crystals, thereby increasing their size.

In order to do this, it is necessary to produce some supersaturation. This is the force which drives crystals out of solution. The greater the amount of supersaturation, the greater the driving force and therefore, the greater is the flexibility of control.

Extensive studies of crystallization have shown that not only the amount of supersaturation but more important, the ability to control supersaturation, is vital for growth of large crystals. The solute must be prevented from coming out of solution where it is not wanted, i.e., on the walls of vessels and/or heat exchanger surfaces, and in the form of numerous small crystals. To control supersaturation and achieve growth, nucleation must be controlled.

In view of this, and other factors, it is apparent that, in order to produce large ice crystals commercially, one must:

(1) Produce the greatest amount of supersaturation possible without causing spontaneous nucleation or "showering" of fines.

(2) Prevent this supersaturated solution from depositing crystals in undesirable places, such as on cooling surfaces, vessels, pipe, and pumps.

(3) Control nucleation to a specific number of nuclei as represented by the number of large crystals to be made per unit time.

(4) Encourage de-supersaturation to take place in the presence of large numbers of almost fully grown crystals of the solute. Solute will tend to come out of solution and deposit on the faces of existing solute crystals.

In normal crystallization, the solute must diffuse through the solution to the surface of a seed crystal or spontaneously formed nucleus. With production of ice from sea water, the water must diffuse through the constantly more concentrated solution. If the degree of supersaturation is greater than that permissible for the diffusion of pure water through the solution surrounding the nucleus, crystal growth cannot proceed and new nuclei will be formed spontaneously in suspension outside the sphere of influence of the previously formed nucleus or seed.

Another objective that must be met in the crystallizer is to achieve consistent washing and purity of crystals. To do this, the crystals must be relatively large and uniform in size. In order to produce crystals with these characteristics, some means of classification is necessary. In crystallization, hydraulic classification has not only the advantage of separating the large crystals so that they may be recovered as discrete uniform particles, free of fines, but also has the advantage of suspending crystals below the desired size in the supersaturated solution for continued growth.

By application of Stoke's Law, a crystallizer and hydraulic classifier has been designed which will classify ice crystals. To accomplish the removal of the large crystals and at the same time, to hold the smaller crystals in suspension for further growth, the mass velocity of the saline system is hydrodynamically balanced against its linear velocity. The mass velocity is reduced by the quantity of solid removed from the system as product. From each succeeding zone it is reduced by the quantity that reverts to the preceding zone because of terminal velocity increase which is due to crystal growth. We have found that a hydrodynamically balanced system can be established by controlling the linear velocity of the solution by varying the cross-sectional area of the crystallizer body.

In the classification of ice crystals from saline solutions, the terminal velocity of the crystals is negative because of the lower density of the ice. Large crystals will, therefore, rise against a downwardly flowing stream of saline water contrary to normal crystal behavior. The downward movement will carry fines with it. We have found that the optimum shape lies in the use of an inverted cone.

Large crystals would have a higher terminal velocity than smaller crystals with respect to the solution in which they are suspended. Control of the velocity of the solution results in a relatively high terminal velocity for large crystals which will permit them to travel in the opposite direction to the mass flow. The crystals moving against the flow of the solution are then removed for final separation.

It is desirable from a process viewpoint to have seed in the supersaturated feed solution in order to start the orderly growth of crystals. Such a growth on preformed seed will retard and even prevent the solution from reaching the labile phase of supersaturation where spontaneous nucleation results. To furnish this seed, the classifying crystallizer of our invention is calculated to retain only crystals above a predetermined mesh size, e.g. 20 mesh. Crystals finer than this will be removed from the classifier in the recycle stream and will become seed in the subsequent freezing cycle.

In view of the foregoing considerations, we prefer to use an inverted cone crystallizer and hydraulic classifier 10 (see FIG. 1b). A supersaturated saline solution, containing seed crystals, enters the crystallizer-classifier 10, via line 12. Ice crystals are suspended in the downward flowing supersaturated saline solution. The solution exhibits a gradually decreasing linear velocity because of the increasing cross-sectional area of the crystallizer body 10. As crystal growth progresses, the rising velocity of the crystals overcomes the downward velocity of the solution, in conformance with Stoke's Law, and the large crystals continue to rise in the narrow elutriator section or column 10a.

The more concentrated saline solution adhering to the crystals is displaced by fresh feed (sea water) entering via line 12, which is also the feed for the next freezing cycle. The sea water is, in turn, displaced by fresh wash water returning to the elutriation section 10a. The fresh wash water comes from an ice melter 22, via lines 16, 18 and 20.

The major portion of the fresh water used for displacement will remain in the crystal mass. A portion of it is frozen by heat transfer to the subcooled ice. The amount of displacement water is minimized, by growing large crystals, for the following reasons. Large uniform crystals are much freer draining than small or non-uniform crystals. Very small crystals and non-uniform crystals have a tendency to pack with very low interstitial volume. These spaces between crystals will retain mother liquor by capillary attraction. Additionally, the smaller crystals have a higher surface to volume ratio and, therefore, the amount of mother liquor held on the crystals by pure surface tension effects is proportionally greater.

Large uniform crystals retain very little mother liquor by capillary attraction as the points of contact between crystals are much smaller in relation to crystal volume. The remainder of the mother liquor is retained by adhesion to the crystal surface. The minimum surface to volume ratio would exist with large uniform spherical crystals.

When filtering extremely small crystals, it is not uncommon to produce filter cake which will contain as much as 80–85% liquids. On the other hand, with large, uniform crystals, the liquid content can be reduced to about 1%.

In most of the processes developed for production of ice from sea water, the crystals have been so small that as much as 50 percent by weight of the mother liquor (containing as much as 70,000 p.p.m. dissolved solids) is entrained when the crystals are free-drained. Based on the need for displacement of 99.3%, and assuming that it is effective, and that 100% of the mother liquor (containing 70,000 p.p.m. solids after a 50% freeze-out) is displaced, the weight of displacement water will equal the weight of the product. This displacement water (500 p.p.m. solids) will be retained in the crystal mass and will be so reflected in the melt. Therefore, 50% of the melt is used in recycle for displacement of mother liquor in batch operation. One disclosure claims to achieve this in a countercurrent system using only 5% of the weight of ice as displacement water. This water is lost in the process.

If a 50% freeze-out can be achieved with large spherical crystals (8 mesh) which will drain to 10% mother liquor (70,000 p.p.m. salts), the total mass will contain 7000 p.p.m. of salts. Using a countercurrent displacement method, it is possible to reduce salinity of large crystals, which free-drain to 10% mother liquor, to 20% of the salinity of fine crystals. This is equivalent to producing ice of the same salinity as the fine crystals with 20% of the displacement water required, or 1% of the ice melted.

It has been found that the growth of large crystals depends upon being able to produce supersaturation under controlled conditions, and preventing de-supersaturation until the solution is in contact with crystal nuclei which act as seed for additional growth.

For classification and separation of the large crystals, an inverted cone therefore appears to be the optimum design, where the ice crystals have a lower density than the mother liquor and rise to the top. The inverted cone crystallizer of our invention is also very flexible and can be more readily adapted to the high flow rates required for ultimate production capacity than other classifiers of the prior art.

While the just proposed inverted cone crystallizer 10 provides the ideal environment for growing large crystals, without a method and means for obtaining controlled supersaturation in the solution fed, via line 12, into the suspension chamber, this process would not be feasible.

*Control of supersaturation by multi-stage absorption*

We have devised a novel and unique method for economically producing a great amount of controlled supersaturation by direct freezing techniques. Of the various substances considered as the direct refrigerant, carbon dioxide appears to have all of the necessary properties for reasons previously mentioned and its use will therefore be described here in particular.

In the intermediate pressure process, a unique approach is therefore employed whereby sea water can be cooled a substantial amount below its freezing point by the simple method of dissolving $CO_2$ in its under pressure and forming the monohydrate. As long as the $CO_2$ stays dissolved, the solution can be said to be supersaturated with respect to ice. As long as the $CO_2$ pressure is maintained, the solution can be handled, pumped, and transported without ice crystallizing out where it is not desirable.

In the intermediate pressure process, by relieving pressure gradually, supersaturation is increased gradually and ice is caused to crystallize out where and when required upon release of pressure. The final release of pressure occurs in the crystallizer-classifier 10. In the high-pressure process $CO_2$ is dissolved in the sea water at higher pressures to form a supersaturated solution of $CO_2 \cdot 6H_2O$ crystals directly. The carbon dioxide-hexahydrate crystals formed also crystallize out in a crystallizer of the same novel design as crystallizer-classifier 10 as will be described.

The formation of carbonic acid is exothermic, and conversely, the dissociation is endothermic. The energy differential due to the heat of formation is 8500 B.t.u. per pound mol, or 193 B.t.u. per pound of carbon dioxide absorbed or desorbed. Upon release of pressure in the intermediate pressure process the heat of dissociation of carbonic acid will furnish direct refrigeration for the production of ice. Thus not only is a method of reducing freezing point obtained resulting in supersaturation, but also a method capable of producing a substantial direct internal refrigeration is provided. So far as is known, carbon dioxide has never heretofore been proposed to utilize both the heat of vaporization and the heat of dissociation of carbonic acid in freezing water from aqueous solutions such as sea water.

In producing supersaturation in both the high and intermediate pressure processes, the naturally alkaline sea water feed stream is first preferably neutralized, by countercurrent contact at atmospheric pressure with flue gases or exhaust gases containing $CO_2$. The exhaust gases may come from the prime movers of the compressors employed in the process. The saline system discharge from the neutralizer is pumped to the top of a first stage carbon dioxide absorber where it is contacted concurrently with carbon dioxide from a carbon dioxide desorber maintained at the same pressure. The saline system solution velocity is such that it will entrain the carbon dioxide gas being absorbed. The heat of absorption is continuously removed by refrigeration to maintain an isothermal system. The temperature of the isothermal system is maintained above the freezing point of the $CO_2$-saline water system and below the freezing point of water. This preferable temperature range lies between 24–30° F. in the intermediate pressure process. In the high pressure system, the temperature can be in the range of 40–52° F.

The saline system effluent from the first stage absorber is then pumped to a second stage absorber at a higher pressure where carbon dioxide from another desorber is absorbed.

In both the intermediate and high pressure process, the absorption and desorption continue through repeated stages in equal increments until the saline system from the second to last absorber is pumped to the last absorber at intermediate or high pressures. In this last absorber, carbon dioxide for absorption comes from the last stage of desorption through $CO_2$ compressors, the $CO_2$ being compressed to slightly above the pressure maintained in the final stage of absorption.

In the intermediate pressure process, assuming ten stages of absorption with countercurrent desorption, ten percent of the carbon dioxide available above one atmosphere of pressure is released per stage of desorption. The dissociation of the equivalent amount of carbonic acid furnishes 10% of the total refrigeration required. The linear velocity of the saline water discharging from the desorption column is maintained at a point approximately midway between the minimum required for ice entrainment and the maximum allowable to preclude gas entrainment. Each succeeding step of desorption is designed to operate in the same manner until the tenth stage is reached. The tenth stage of desorption takes place below the surface of the ice in the elutriation section 10a and just above the liquid level in the classifying crystallizer 10 itself.

In the intermediate pressure multi-stage system just described, the carbon dioxide is released in small increments. This incremental release produces a degree of supersaturation conducive to the growth of large crystals rather than the showering of nuclei and fine crystals. In a low pressure system where carbon dioxide is released in a single stage, full refrigeration will be produced, and there is a good possibility that only nuclei or extremely small crystals would be thrown out of solution.

Our intermediate-pressure system, e.g. about 25 atmospheres or below, also has cost advantages. The solubility of carbon dioxide at 25 atmospheres is about ten times the solubility at 2 atmospheres. A recycle stream, to absorb sufficient carbon dioxide to furnish the required refrigeration would therefore be required to be ten times as great for the low pressure system as for the high pressure system. The lower recycle rate of the high pressure multi-stage system also permits the use of smaller equipment. The cross-sectional area of the crystallizer in the high pressure system, for instance, is only about one-tenth that of the low pressure system, assuming crystals produced in both systems are identical.

In either high or intermediate pressure processes, multi-stage freezing has advantages over single stage freezing because of the substantially lower volume of recycle required for absorption of carbon dioxide and the control of the degree of supersaturation which it affords. However, the energy required for compression of carbon dioxide for intermediate or high pressure absorption in a single stage is much greater than for a low pressure system. In order to make multi-stage freezing economically feasible, the just-described multi-stage absorption is incorporated simultaneously.

By introducing multi-stage absorption in increments equal to desorption, the carbon dioxide desorbed at a definite pressure can be absorbed in a countercurrent stream at an equal pressure. In this way, compression of $CO_2$ is bypassed except for the last stage of absorption, and only a small fraction of $CO_2$ compared to the total $CO_2$ in process, needs being compressed, this fraction being equal to the inverse of the number of absorption-desorption stages.

More detailed descriptions of our intermediate pressure process and of our high pressure process follow.

*The intermediate-pressure process*

An intermediate-pressure process, utilized for the conversion of sea water will now be set forth with specific reference to FIGURES 1a and 1b. A multi-stage absorption-desorption system for the formation of a controlled supersaturated monohydrate of carbon dioxide (carbonic acid) and of ice itself will be specifically described in conjunction with our novel crystallizer-classifier 10.

In order to control supersaturation of ice crystals or solid hydrate crystals of $CO_2$ in the sea water, a maximum amount of a hydrate-forming gas, e.g. $CO_2$, is first absorbed by the sea water, under specific conditions of pressure and temperature. The degree of supersaturation obtained is dictated by the direct refrigeration effect obtainable when the $CO_2$ is released.

In order to control the supersaturation, the desorption (decompression) of $CO_2$ from the sea water is incrementally performed in a multiple number of stages. Furthermore, in order to conserve substantial energy, the $CO_2$ released in each stage, is passed countercurrently to the saline water system, at the same pressure, and is thereby absorbed by the saline water in a multiple number of stages. In this way, the only $CO_2$ that need be compressed is that required for the last stage of absorption, a fraction of that required for the entire process.

Further energy is recovered by power recovery turbines connected between stages of desorption, the power recovered being employed to pump the sea water between various stages of absorption.

The heavily supersaturated slurry of ice and saline water and carbonic acid then passes into a crystallizer-classifier 10 at atmospheric pressure for final desorption, crystallization and separation of ice crystals from mother liquor.

Specifically, sea water enters the process system via line 50, and a major portion is pumped, via lines 52, 54 to a neutralizer 56. (Sea water is alkaline, and in order to neutralize the alkalinity, $CO_2$-containing flue gases are preferably countercurrently contacted with the sea water, at atmospheric pressure, in the neutralizer 56.)

The remaining portion of the entering sea water moves along line 53 and line 51, and is used for condensing the ammonia refrigerant, the carbon dioxide, and for cooling flue gases, as will be described.

The sea water in line 53 branches off into three lines, 53a, 53b and 53c, line 53a leading to the flue or exhaust gas aftercooler or heat exchanger 74, line 53b leading to a $CO_2$ intercooler 75, and line 53c leading to a $CO_2$ aftercooler or condenser 77. The warmed sea water leaves the pieces of equipment 74 and 77 via lines 79 and 83, respectively, and is recombined in line 85b. This sea water is combined with the warmed sea water from line 81, in line 87 for return to the sea.

The sea water in line 51 passes through a first stage ammonia condenser 107, thence along line 85a, to be recombined with other warmed sea water in line 79a.

The flue gases preferably used are the exhaust gases from oil- or gas-fired prime movers of the carbon dioxide and ammonia compressors employed in the process. Thus, the exhaust gases, containing $CO_2$, leave the drivers of ammonia compressor 60, and the carbon dioxide compressors 64, 62, via lines 66, 68 and 70, respectively. The exhaust gases in lines 66 and 68 join in line 72. The combined exhaust gases in line 72 are further combined with the exhaust gases in line 70, and are cooled in heat exchanger 74 by sea water entering the heat exchanger from line 53a, as mentioned.

The cooled exhaust gases are then sent, along line 76, to the bottom of the neutralizer 56, and thereby countercurrently contact downflowing sea water while being cooled by the cold bleed stream which is sent along line 86 from the line 84. The countercurrent contact with the exhaust or flue gases absorbs sufficient carbon dioxide to neutralize the inherent alkalinity of the sea water, and at the same time strips out noncondensable gases dissolved in the sea water. The sea water is thus saturated at 14.7 p.s.i.a. with $CO_2$ in equilibrium with the products of combustion.

Additional $CO_2$ may be added to inlet line 76, if necessary, to accomplish neutralization and saturation. This additional $CO_2$ enters line 76 via branch line 78. The branch line 78 is, in turn, connected to the main $CO_2$ line 80.

The exhaust gases, containing the inert gases and $CO_2$ in equilibrium, leave the neutralizer 56 via line 82.

The neutralizer 56 is essentially a shell and tube heat exchanger. A portion of the very cold mother liquor (e.g. 24° F.) leaving the crystallizer-classifier 10 via line 84, is pumped to the shell side of the neutralizer 56, via line 86, and there cools incoming sea water which enters the top of the tubes of the neutralizer 56. The warmed mother liquor is bled from the neutralizer 56 and from the system via line 86a. The carbon dioxide lost in the waste liquor line 86a is made up from $CO_2$ in the exhaust gases in the neutralizer 56.

The bulk of the mother liquor, e.g. 90%, is recycled along line 88 and intermixed with neutralized fresh sea water, leaving the neutralizer along line 90, into line 91.

The mixed sea water stream in line 91 is pumped, by pump 93, along line 92, to the top of a first stage carbon dioxide absorber 97. The absorber, as are all the absorbers in the system, is a shell and tube heat exchanger for reasons to be described.

Assuming that a ten-stage absorption system is employed, the pressure in the first stage absorber employed is preferably of the order of 35-40 p.s.i.a. This pressure is chosen so that the amount of $CO_2$ absorbed in this stage is 10% of the total $CO_2$ absorbed by the saline system in the ten stages. (Each absorption stage preferably contributes an equal addition of $CO_2$, and also, each stage of desorption preferably gives up an equal amount of $CO_2$.)

Carbon dioxide, at the same pressure as in the first stage absorber 97, is fed from the ninth stage desorber 94, along line 96, into the first stage absorber. The carbon dioxide contacts the downwardly flowing saline solution in co-flow relationship at the top of the absorber 97. The solution velocity is sufficiently high so that it entrains the $CO_2$ being absorbed. Maximum absorption is found to take place at the top of the absorber by this mode of operation. Any undissolved $CO_2$ entrained is pumped to the next succeeding stage of absorption.

The heat of absorption (heat of formation of the monohydrate of carbon dioxide) in absorber 97 and in the other absorption stages is continuously removed by ammonia refrigeration to maintain an isothermal system at a temperature of just under 32° F., and preferably about 26-30° F. The required refrigeration is accomplished by expansion of liquid ammonia on the shell side of the absorber 97. The liquid ammonia enters absorber 97 via branch line 98 and main line 100, and leaves, via branch line 102 and main line 104, to be recompressed by the ammonia compressor 60. Upon recompression, the ammonia is sent, via line 106, through heat exchangers 107 and 108, where it is first cooled by fresh sea water and then condensed by heat transfer with the cold product water. The liquid ammonia is then sent to a receiver 110, via line 112, for use as the refrigerant in all stages of absorption.

The saline solution (now at a pressure of 35–40 p.s.i.a. and saturated at this pressure with $CO_2$) leaves the first stage absorber 97, via line 113, and is pumped, along line 114, to the second stage absorber 116, by means of pump 118. The solution is pumped to the second stage absorber at a higher pressure than in the first stage, e.g., 60–65 p.s.i.a. The solution, at this pressure, can absorb another 10% of $CO_2$.

Desorption in an eighth-stage desorber (not shown) occurs, as described previously with reference to the ninth-stage desorber 94, and $CO_2$ is thereby furnished, via line 119, at the same pressure as in the second-stage absorber, to the saline solution.

The heat of absorption is removed by ammonia expansion as described previously, liquid ammonia entering the shell side of the absorber 116 along branch line 120 and leaving as a gas along branch line 122 to be recompressed and condensed.

The saline solution leaves the second-stage absorber 116, via line 117. The absorption of carbon dioxide in the solution (and the desorption of carbon dioxide) continues in equal increments (10%) $CO_2$ adsorption-desorption per stage) through adsorption stages 3, 4, 5, 6, 7 and 8, and desorption stages 7, 6, 5, 4, 3 and 2. The effluent saline solution from the eighth-stage absorber (not shown) is pumped from line 121, by pump 123, to the ninth-stage absorber 124, at a pressure of about 310 p.s.i.a., via line 126. Ten percent of the total $CO_2$ in process is absorbed by the saline system, as before. $CO_2$ from the ninth-stage desorber 130, is fed to absorber 124, via line 128. This $CO_2$ in desorber 130 is maintained at the same pressure as absorber 124.

The ammonia refrigeration is employed as before to maintain an isothermal system in the absorber 124, liquid ammonia entering the shell side of the absorber via branch line 134, and leaving as a gas, via branch line 136.

The effluent saline solution leaves absorber 124 via line 140 and is fed to the top of the tenth and final absorber 138, along line 144, by pump 142. The solution is now maintained at a pressure of approximately 367 p.s.i.a. The final 10% of $CO_2$ is absorbed in absorber 138. The $CO_2$ is fed into the absorber 138 from main $CO_2$ line 80. The main line is connected to first and second-stage $CO_2$ compressors 62 and 64, which compress the $CO_2$ from the final stage of desorption in crystallizer 10, to slightly above the required pressure.

The heat of absorption is removed by ammonia expansion, as before, liquid ammonia entering the shell side of absorber 138, via main line 100, and leaving as a gas, via main exit line 104.

The 24–30° F. saline system now contains the total amount of $CO_2$ to be absorbed. If all of the $CO_2$ were released to the crystallizer at this point, the sudden release would be extremely detrimental to crystal growth. The resulting high velocity of the carbon dioxide through the elutriation section or column 10a of the crystallizer 10 would entrain large quantities of saline water, making it impossible to achieve displacement of the saline water with wash water.

Furthermore, the sudden release of all of the available $CO_2$ would cause such rapid subcooling that all the ice would be thrown out of solution as nuclei. Controlled supersaturation, so necessary for large crystal growth, would be entirely absent.

Because of these deficiencies a multi-stage desorption of $CO_2$ in equal small increments is employed (e.g., 10% in each stage of a ten-stage desorption system). In each stage of desorption, 10% of the total refrigerating effect is obtained, due both to the endothermic heat of dissociation of the hydrate, and to the endothermic heat of vaporization of $CO_2$.

The desorption of the monohydrate commences when the monohydrate is taken from the bottom of absorber 138, via line 148, and is depressurized, to 310 p.s.i.a. (equal to the pressure in ninth-stage absorber 124), through a turbine 150 which drives the feed pump 142. As will be recalled, feed pump 142 pumps the saline solution upgrade from the ninth-stage absorber 124 to the final stage of absorption in absorber 138.

The pressure on the solution to each stage of desorption is similarly released through such a power recovery turbine which is connected through a motor to the pump feeding the next stage of absorption. In this manner, energy is conserved. The pump and turbine constitute a balanced system wherein the only external energy required is that needed to remedy pump and turbine inefficiencies and the pressure drop due to line friction.

The depressurized slurry is fed to the first-stage desorber 130, via line 152, 10% of the $CO_2$ being separated from the saline slurry. The separated $CO_2$ passes along overhead line 128 to the ninth-stage absorber 124 at the same pressure as exists in this absorber, e.g. 310 p.s.i.a.

Entrainment of water in the $CO_2$ in line 128 does not present a problem at this stage since the $CO_2$ passes directly to absorber 124 for reabsorption at approximately the same pressure. No special equipment is therefore required.

As desorption proceeds in the desorption column or tower 130, the dissociation of 10% of the $CO_2$ present above one atmosphere in the slurry furnishes 10% of the total refrigeration ultimately obtained.

The linear velocity of the slurry in the desorption column 130 is maintained at a point above the minimum required for solid ice and solid hydrate entrainment and below the maximum allowable to prevent gas entrainment.

The slurry from desorber 130 is fed to the second-stage desorber 158, via line 160, through a turbine 162 (where it is depressurized) and thence pumped upwardly to the desorber 158 along line 164. The slurry, in this second-stage desorption, is further directly refrigerated, and thereby achieves still greater supersaturation with respect to ice but in a controlled manner and without a showering of nuclei. The dissociated $CO_2$ gas passes to the eighth-stage absorber (not shown), via line 166.

The slurry, now more supersaturated with respect to ice, passes from desorber 158, via line 168, to the third stage of desorption (not shown). This step of desorption operates in the same manner just described, as do the succeeding steps of desorption until the ninth stage of desorption is reached.

In the ninth stage of desorption, the heavily supersaturated slurry from the eighth stage of desorption (not shown) flows along line 170, through depressurizing turbine 172, thence to the desorber 94 along line 174. Further direct refrigeration occurs in desorber 94. The very heavily supersaturated slurry leaves the bottom of desorber 94, and is pumped through a repressurizing turbine 176 to the crystallizer-classifier 10 for the tenth and final stage of desorption at atmospheric pressure.

It will be apparent from the foregoing that the absorption of the required amount of $CO_2$ to obtain the required amount of refrigeration is accomplished in a very economical and controlled manner. In essence, as desorption and refrigeration proceed in incremental stages, controlled supersaturation is obtained. The $CO_2$ released in each stage of desorption (or other hydrate-forming gas) is countercurrently absorbed by saline water, at the same pressure. Energy is thereby conserved for only the last stage of absorption requires the highly compressed $CO_2$ direct from the compressors, and the $CO_2$ required to be fed to this last stage of absorption is a fraction of the total in process. This fraction is $1/n$, where $n$ is the number of stages of absorption. Thus, in a ten-stage system, only 10% of the $CO_2$ in process need be compressed.

Further energy conservation is obtained by depressurizing the slurry between desorption stages through power recovery turbines. The energy recovered is used in pumping the slurry from lower to a higher stage of absorption.

The tenth and final stage of desorption of the slurry, in line 12, occurs in the crystallizer-classifier 10, as previously mentioned. The crystallizer-classifier 10 is held at atmospheric pressure. The tenth stage of desorption takes place below the surface 10b of the large ice crystals in the elutriator section 10a, and just above a liquid level 10c formed in the crystallizer-classifier 10.

The $CO_2$ or other hydrate-forming gas released in the crystallizer-classifier 10 assists in raising the large crystals of ice in the elutriation column or zone 10a, thereby providing a more thorough contact of wash water, entering the top of elutriation section 10a, via line 20. The gas released passes, via line 180, to a first stage compressor 64, thence via line 181 to an intercooler 75, and via line 183 to the second stage compressor 62. A mist eliminator (not shown) is provided above the elutriation zone 10a to prevent entrainment of liquid, in the $CO_2$ gas, going to the compressors 62, 64.

The crystallizer-classifier 10 is preferably designed so that crystals of 8 mesh and larger will rise into the elutriation section 10a. Therefore, the downward slurry flow, at the point of entry 184 to the crystallizer 10, will have a velocity less than the rising velocity of 8 mesh or larger crystals. Crystals smaller than 8 mesh will be retained in a zone below the throat of the crystallizer-classifier 10 until such time as they grow large enough to develop a terminal velocity greater than the downward fluid slurry velocity.

To prevent these smaller crystals from being carried through the crystallizer 10 before further growth can be realized, it is necessary to lower the solution velocity. This, as mentioned, dictates an increasingly larger cross-sectional area of crystallizer 10, i.e., an inverted cone design.

The crystallizer diameter is thus constantly increased to maintain the downward solution velocity in hydrodynamic balance with the continually smaller crystals which are entrained. Supersaturation of the solution to support continued growth of the smaller crystals so that they will exhibit increasing velocities contrary to the direction of flow is obtained by desorbing the last 10% of the carbon dioxide in the crystallizer 10. Thus, progressively down the cone of the crystallizer 10, the smaller crystals are growing and rising, thereby reducing the supersaturation of the solution.

The size of the crystals existing in the crystallizer-classifier 10, at the greatest diameter level, e.g. 84 feet is 20 mesh. It has been found that very little growth can be anticipated because of the low degree of supersaturation remaining in the solution at this point, and these crystals are entrained in the mother liquor solution leaving via line 84.

The mother liquor leaving the crystallizer-classifier 10 via line 84 is then fed to recycle stream 88 and bleed stream 86. The crystals are inert and in the recycle stream 88 will pass through the absorption stages without change of phase, since the system is isothermal. These crystals act as seed for the subsequent desorption cycle and assist in retarding abortive nucleation.

The 8-mesh and larger ice crystals rise in the elutriator section 10a into which fresh water, at its freezing point, flows countercurrently to the crystals. The fresh water employed comprises a portion of the product produced in ice melter 22, and is passed from the ice melter, via lines 16, 18 and 20, to the elutriator section 10a.

The fresh water becomes progressively more saline, as it flows downwardly in the elutriator section 10a, displacing mother liquor adhering to the ice crystals.

The washed ice crystals float slightly above the level 186, which is the top of the elutriator column 10a, and are raked off the surface, by suitable mechanical means, and transferred, by gravity flow, via line 187, to the ice melter 22.

The classifier-crystallizer 10, for a typical large installation (e.g., 5,000,000 gallons per stream day), can be 135 ft. high overall, have an 84 ft. diameter at the bottom, and a diameter of 10½ ft. at the point of entry 184 of the slurry.

The washed ice crystals are transported to the ice melter 22 and are melted therein by contact with recirculated, relatively warm, potable water, entering via line 188, which has been employed to condense ammonia in condenser 108.

The ice melter 22 is of inverted cone shape. The ice crystals are suspended in the warm potable water stream from the ammonia condenser and as melting progresses, the crystals become smaller and travel downwardly through the cone. The larger ice crystals, obeying Stoke's Law, remain at the top of the cone, and thereby initially contact the warmest water. This mode of melting ice crystals is extremely efficient since the larger more difficult-to-melt ice crystals are melted with the warmest water. Also, the use of an inverted cone eliminates the need for mechanical agitation.

The largest diameter of the inverted cone design is of such size that only exceedingly small crystals are entrained in the discharge product water, leaving the ice melter 22 through line 16. The slight entrainment is not detrimental, however, since the product water is pumped, via line 18, through the ammonia condenser 108, and assures that the condensed ammonia will be at the lowest temperature attainable.

An ice melter 22, for a 5,000,000-gallon-per-stream-day sea water conversion plant, may have dimensions as follows: largest diameter 30 ft. and height 37.5 ft.

The product water leaves the ice melter 22, via line 16, is pumped along line 18, and split into two streams, the wash water stream 20, and stream 21. The stream 21 is passed in heat exchange with second stage ammonia in condenser 108 and thereby condenses ammonia. The warm potable water leaving the ammonia condenser 108, via line 190, passes to a knockout drum 192 equipped with a demister (not shown). Residual carbon dioxide released from the warm water is passed to the carbon dioxide compressors 62, 64, via lines 194 and 180. The potable water is then removed along line 196, and split into two streams, a portion of the water passing along line 198 and out of the system as product, and the remainder being recycled, via line 188, for ice-melting purposes.

Based on the processing of 10,000,000-gallon-per-stream-day plant (g.p.s.d.) of sea water initially containing 35,000 parts per million (p.p.m.) salts, the following data is typical:

| Stream or Equipment | Temperature (° F.) | Pressure (p.s.i.a.) | Amount (lbs./hr.) |
| --- | --- | --- | --- |
| Inlet Sea Water (35,000 p.p.m. salts): | | | |
| Line 50 | 60 | 14.7 | 3,939,000 |
| Line 53 | 60 | 14.7 | 1,099,000 |
| Line 49 | 60 | 14.7 | 5,883,000 |
| Line 54 (to neutralizer) | 60 | 14.7 | 6,957,000 |
| Product Line (187) from Elutriator | 25 | 14.7 | 3,650,800 |
| Wash Water (line 20) | 32 | 14.7 | 173,800 |
| Potable Water (line 198) | 52 | 14.7 | 2,477,000 |
| Bleed line 86 to Neutralizer | 25 | 14.7 | [1] 3,486,000 |
| Neutralizer 56 | 48 | 14.7 | 6,957,000 |
| Recycle Line 88 | 25 | 14.7 | [2] 40,162,000 |
| Line 92 (to first stage Absorber 97) | 30 | 37 | 47,130,400 |
| $NH_3$ Line 98 to first stage Absorber 97 | 54 | 75 | 364,000 |
| $CO_2$ Line 96 (to first stage Absorber 97) | 28 | 37 | 270,500 |
| To second stage Absorber 116: | | | |
| $NH_3$ (line 120) | 54 | 95 | 102,300 |
| $CO_2$ (line 118) | 28 | 62 | 270,500 |
| Saline Water Feed (line 114) | 28 | 62 | 47,400,700 |
| To 3rd stage Absorber (not shown): | | | |
| $NH_3$ | 54 | 95 | 102,300 |
| $CO_2$ | 28 | 88 | 370,500 |
| Saline Water Feed | 28 | 88 | 47,671,400 |

| Stream or Equipment | Temperature (° F.) | Pressure (p.s.i.a.) | Amount (lbs./hr.) |
|---|---|---|---|
| To 4th stage Absorber (not shown): | | | |
| $NH_3$ | 54 | 95 | 102,300 |
| $CO_2$ | 28 | 120 | 270,500 |
| Saline Water Feed | 28 | 120 | 47,941,900 |
| To 5th stage Absorber (not shown): | | | |
| $NH_3$ | 54 | 95 | 102,300 |
| $CO_2$ | 28 | 150 | 270,500 |
| Saline Water Feed | 28 | 150 | 48,212,400 |
| To 6th stage Absorber (not shown): | | | |
| $NH_3$ | 54 | 95 | 102,300 |
| $CO_2$ | 28 | 183 | 270,500 |
| Saline Water Feed | 28 | 183 | 48,482,900 |
| To 7th stage Absorber (not shown): | | | |
| $NH_3$ | 54 | 95 | 102,300 |
| $CO_2$ | 28 | 220 | 270,500 |
| Saline Water Feed | 29 | 220 | 48,753,400 |
| To 8th stage Absorber (not shown): | | | |
| $NH_3$ | 54 | 95 | 102,300 |
| $CO_2$ | 28 | 264 | 270,500 |
| Saline Water Feed | 78 | 264 | 49,023,900 |
| To 9th stage Absorber 124: | | | |
| $NH_3$ (line 134) | 54 | 95 | 102,300 |
| $CO_2$ (line 128) | 28 | 310 | 270,500 |
| Saline Water Feed (line 126) | 28 | 310 | 49,294,400 |
| To 10th stage Absorber 138: | | | |
| $NH_3$ (line 100) | 54 | 95 | 102,300 |
| $CO_2$ (line 80) | 80 | 367.5 | 270,500 |
| Saline Water Feed (line 144) | 28 | 367.5 | 49,564,900 |

¹ 243,400 salts.
² 2,803,000 salts.

The saline slurry system is then desorbed in ten stages, losing 270,500 lbs. $CO_2$/hr. in each stage. In each stage of desorption, the pressure and temperature on the saline slurry system are decreased as follows:

| | p (p.s.i.a.) | T., ° F. |
|---|---|---|
| Stage 1 (absorber 130) | 310 | 24.6 |
| Stage 2 (absorber 158) | 264 | 24.6 |
| Stage 3 (not shown) | 220 | 24.6 |
| Stage 4 (not shown) | 183 | 24.6 |
| Stage 5 (not shown) | 152 | 24.5 |
| Stage 6 (not shown) | 120 | 24.5 |
| Stage 7 (not shown) | 88 | 24.5 |
| Stage 8 (not shown) | 62 | 24.4 |
| Stage 9 (absorber 94) | 37 | 24.4 |
| Stage 10 (in crystallizer-classifier 10) | 14.7 | 24.3 |

The pressures and temperatures may be varied in each stage and other variations and modifications will readily occur to those skilled in the art.

The high-pressure process

In the high-pressure process embodiment of our invention, $CO_2$, or other hydrate-forming gas, is introduced into solution, such as saline water, in increments. Each increment of $CO_2$ is introduced at successively higher pressures to form solid multi-hydrate crystals of $CO_2$—probably $CO_2 \cdot 6H_2O$, the hexahydrate—at pressures above 660 p.s.i.a. and temperatures below about 52° F.

The heat of formation of the hexahydrate is about 200 B.t.u./pound which, of course, is somewhat more than the heat of formation of ice. However, while the heat of formation is greater, and the pressure required for formation is substantially greater, the temperature at which the hydrate is formed under this pressure may be as high as 52° F. Ordinary sea water at 35–45° F. or melting hydrate crystals can therefore be used as a refrigerant obviating the entire ammonia refrigeration system previously described.

Also, by utilizing this high pressure to obtain the hexahydrate, the recycle requirement is reduced by a ratio of 6:1 compared to the process described with reference to FIGURES 1a and 1b. Furthermore, by employing the concept of countercurrent absorption and desorption, the $CO_2$ requirement is reduced by a factor of 50% or more.

Once the hexahydrate crystals are formed, they may be separated in a crystallizer which is maintained at a high pressure of the order of 660 p.s.i.a. to retain the hexahydrate.

While it is true that solid hydrate crystals have a density greater than ice crystals, the solid hydrate crystals may or may not have a greater density than the slurry vehicle entering the crystallizer. In those cases where the slurry vehicle is very heavy, the solid hydrate crystals will rise and the novel crystallizer, described previously, is employed. In those cases where the slurry vehicle is of lesser density than the solid hydrate crystals, a crystallizer of conic shaped design (with the apex at the bottom) or other conventional crystallizer design may be employed.

In any event, the separated crystals are then washed of adhering brine by wash water. These crystals, containing $CO_2$, are then passed through desorbers maintained at ever-decreasing pressures.

The desorbers are maintained in heat-exchange relationship with the multi-stage absorbers. In this manner, the endothermic heat of dissociation of the hydrate crystals can maintain the absorbers in an isothermal condition. Thus, the melting hydrate preferably acts as a coolant. Ammonia refrigeration or the like, as in the intermediate pressure process, is not required. Furthermore, the $CO_2$ released as the hydrate dissociates in the various stages of desorption is absorbed by the saline water in the various stages of absorption, as in the intermediate pressure process.

The high-pressure process, in which the solid hydrate is lighter than the slurry vehicle, is described in more detail below.

Saline water (sea water—35,000 p.p.m. salts), which has been preferably neutralized with $CO_2$ from flue gas, enters the system through pump 301 and line 302. The stream is split and sent to two separate trains of absorption.

The main stream goes through line 303 to the first stage of absorber 304a of an absorber-decomposer unit 304, where it absorbs carbon dioxide entering via line 306. The $CO_2$, in line 306, comes from the next-to-the-last stage of hydrate decomposition, which takes place in desorber 305b of absorber-decomposer unit 305.

The amount of carbon dioxide absorbed and the pressure at which it is absorbed in absorber 304a, and the other stages of absorption, are controlled by the number of stages being utilized. Thus, if five absorption-desorption stages are employed per train, one-fifth of the pressure at which the $CO_2$ is absorbed is gained in each stage. While absorbing carbon dioxide, the solution evolves heat equal to the heat of formation of the carbon dioxide hydrate being formed. This heat is absorbed by the counterflowing slurry of hydrate flowing through decomposer or desorber 305b. The desorber 305b lies in heat exchange relationship with absorber 305a of unit 305. In this manner, the process is kept isothermal and maintained preferably at a temperature of between 40–52° F. The amount of heat absorbed by the slurry is sufficient to decompose an equal amount of hydrate. (This is true of all absorber-desorbers in both trains.) The carbon dioxide liberated in the final stage of decomposition in desorber 304b is sent through lines 307 and 308 to a compressor 309, where it is compressed to the pressure of the final stage of absorption, e.g., 660 to 700 p.s.i.a.

The saline water carbon dioxide solution from the first stage absorber 304a passes through line 310 to pump 311, thence through line 312 to the second stage of absorption in absorber 305a of absorber-decomposer unit 305. Pump 311 receives a portion of its power from a turbine 313. An electric motor 314 or other satisfactory prime mover makes up the power deficiency of turbine 313. Turbine 313 is driven by the slurry from the previous stage of decomposition in absorber-decomposer 305, through line 324.

The second stream 325 enters the first stage absorber-desorber unit 350a–350b of the second train and absorbs $CO_2$ coming from the desorber 351b via line 352. The heat of formation of the hydrate is absorbed by heat exchange with brine or mother liquor containing carbonic acid, as will be described, rather than by multihydrate crystals as in the first train.

The two streams—line 303 and line 325—each carrying saline water-carbon dioxide solution, progress countercurrently through a series of identical absorber-decomposer units, 360, 361, 362, 363 (identical to units 304 and 305) and turbine-pump combinations (identical to turbine 313 and pump 311) until the $n$th or final stage of absorption in absorber-decomposer units 315 and 326.

In progressing through the train of absorbers at below about 52° F., hexahydrate crystals are formed in suspension (because of the high pressure) and in a gradually increasing state of supersaturation which will cause the hydrate crystals to grow, rather than showering nuclei.

The slurry of the thus-formed solid hexahydrate crystals suspended in the saline water-carbon dioxide solution, saturated with respect to carbon dioxide, passes through lines 316 and 317, without any loss in pressure, to a hydraulically classifying crystallizer 318 of the inverted cone type described previously. Here the larger crystals rise to the elutriator 319 against the downward flowing solution. Small crystals remain suspended and continue to grow in the supersaturated mother liquor in 318.

In the elutriator 319, the differential of specific gravity between the now concentrated brine (salts content— 70,000 p.p.m.) and the hexahydrate will create sufficient pressure on the mass of hydrate crystals to cause the uppermost part of the crystal mass to rise above the solution where the relatively large crystals will drain almost free of brine.

The major portion of the remaining adhering brine is displaced by a spray of fresh wash water entering via line 320 from the final stage of decomposition in desorber 304b.

The washed crystals projecting above the elutriator 319 are then scraped off and reslurried with fresh water from branch line 321. The slurry then progresses countercurrently to the absorption solution in desorbers 315b, 361b, 360b, 305b and into the final stage of decomposition in desorber 304b. A proportional amount of hydrate decomposes in each stage of the train and absorbs the heat of formation of the hydrate being formed in the absorbing stream.

The concentrated brine in the crystallizer 318 is saturated with carbon dioxide at the pressure in the crystallizer, e.g., 660–700 p.s.i.a., to form carbonic acid or a polyhydrate of $CO_2$ less than the hexahydrate. The brine leaves the bottom of the crystallizer 318, via line 329, and passes through a train of desorbers 326b, 363b, 362b, 351b and 350b, via lines 380, 382, 384 and 386, respectively, in an absorber-desorber train. Carbon dioxide is incrementally released from solution in each stage of desorption and is reabsorbed in a countercurrent stream of saline water passing through absorbers via lines 388, 390, 392, 394 and finally passing into line 317 to the crystallizer 318. The release of pressure on the brine stream causes decomposition of the carbonic acid or polyhydrate of $CO_2$ contained therein. The decomposition, being endothermic, absorbs the heat of formation as the hexahydrate is being formed in the absorbing stream.

The carbon dioxide from both final stages of decomposition, released via lines 307 and 396, is compressed in compressor 309, cooled in heat exchanger 322, and sent through line 323 to the final stages of absorption in absorbers 315a and 326a, respectively. As in the intermediate-pressure process, the amount of $CO_2$ compressed is equal to the inverse of the number of stages employed.

Concentrated brine is returned to the sea through line 327, there being no recycle required. The product, fresh potable water, is sent to storage via line 328, while a small portion thereof is sent, via line 320, for wash and slurry-making purposes as described.

Briefly comparing the high-pressure and intermediate-pressure processes, it will be seen that, in both, the hydrate-forming gas, e.g. $CO_2$, is absorbed by the aqueous solution incrementally, i.e., in stages. In the intermediate-pressure process the incremental absorption of $CO_2$ produces a carbonic acid solution supersaturated with respect to ice. In the high-pressure system, the $CO_2$ absorption produces a solution supersaturated with respect to solid hydrate crystals, e.g. $CO_2 \cdot 6H_2O$ crystals.

In the intermediate-pressure process, incremental desorption of $CO_2$ produces ice crystals with controlled nucleation. The crystals are carried eventually to a crystallizer-classifier. In the high-pressure process, the solid hydrate crystals in solution are carried directly to the crystallizer-classifier prior to desorption of the slurry. In both processes, the crystallizer-classifiers employed may be of the inverted-cone type.

In the intermediate-pressure process, external refrigeration of the absorbers is employed to maintain the aqueous solution below the freezing point of water. In the high-pressure process, a higher temperature of 40–52° F. may be employed and maintainance of the aqueous solution at this temperature is accomplished, for example, by heat exchange with cool sea water, perhaps supplemented by artificial refrigeration, or by the melting of hydrate crystals, as previously described.

The incremental desorption of $CO_2$ in both embodiments of our process produces cooling effects. In the intermediate-pressure process, desorption of $CO_2$ occurs in the aqueous solution supersaturated with respect to ice and produces direct internal refrigeration by means of the heat of dissociation of carbonic acid and heat of vaporization of $CO_2$. Ice crystals are thereby formed. In the high-pressure process, desorption of $CO_2$ occurs from both the hydrate crystal slurry and from the separated motor liquor, the cooling effect due to the heat of dissociation and to heat of vaporization being transferred through heat exchange apparatus, to the absorption stream to maintain it between about 40–52° F.

The countercurrent absorption-desorption in incremental stages, as a means of compressing only a fraction of $CO_2$ employed in the process is applicable to both embodiments of our process.

While several embodiments of our invention have been described, many changes and modifications may be made within the scope and spirit of our invention. Therefore, we intend to be bound only by the claims which follow.

We claim:

1. A process for separating water from an aqueous solution, which comprises: passing an aqueous solution into an upper portion of a crystallizing zone, said aqueous solution being supersaturated with respect to water-containing crystals, said aqueous solution moving downwardly in said crystallizing zone at a predetermined decreasing velocity, water-containing crystals in said aqueous solution above a first predetermined mesh size, rising upwardly countercurrent to said downwardly moving aqueous solution; removing said water-containing crystals, above said first predetermined mesh size, from the upper portion of said crystallizing zone; and discharging the resulting aqueous solution of increased concentration from the bottom portion of said crystallizing zone, said aqueous solution thus being discharged containing crystals below a second predetermined mesh size, the latter being smaller than the first predetermined mesh size.

2. The process of claim 1 wherein said water-containing crystals are ice.

3. The process of claim 1 wherein said water-containing crystals are a solid hydrate and the pressure and temperature conditions in said crystallizing zone are sufficient to maintain said hydrate as a solid.

4. The process of claim 1 wherein said water-containing crystals are the hexahydrate of carbon dioxide, and the pressure is above about 660 p.s.i.a. and the temperature is below about 52° F.

5. A process for separating water from an aqueous salt solution, which comprises: passing an aqueous salt solution downwardly through a crystallizing zone at an ever decreasing velocity; crystallizing a water-containing material from said aqueous salt solution, crystals, formed above a first predetermined mesh size, rising upwardly countercurrent to the resulting downwardly moving aqueous salt solution; removing said water-containing crystals above said first predetermined mesh size from the upper portion of said crystallizing zone; and discharging an aqueous salt solution of increased salt concentration from the bottom portion of said crystallizing zone said aqueous solution thus being discharged containing crystals below a second predetermined mesh size, the latter being smaller than the first predetermined mesh size.

6. The process of claim 5 wherein said crystals are ice crystals.

7. The process of claim 5 wherein said downwardly moving aqueous solution is saturated with a hydrate-forming gas.

8. The process of claim 7 wherein said hydrate-forming gas is carbon dioxide, and said aqueous salt solution is a saline water.

9. A process for crystallizing and separating water from an aqueous salt solution having a hydrate-forming gas absorbed therein which comprises: releasing a hydrate-forming gas, contained in a downwardly flowing aqueous salt solution, to supersaturate said solution with ice and cause growth of ice crystals therein, crystals formed above a first predetermined mesh size moving upwardly against the resulting downwardly flowing aqueous salt solution; removing said first ice crystals formed above said predetermined mesh size; and recycling said aqueous salt solution of increased salt concentration, containing ice crystals below a second predetermined mesh size, the latter being smaller than the first predetermined mesh size, for absorption of additional hydrate-forming gas.

10. The process of claim 9 wherein the downward flow of said resulting aqueous salt solution decreases in rate sufficient to enable smaller ice crystals, larger than said second predetermined mesh size, to pass upwardly into a more supersaturated portion of said aqueous solution.

11. The process of claim 10 wherein said first predetermined mesh size is about 8 mesh, and said second predetermined mesh size is about 20 mesh size.

12. A process for crystallizing water from a given aqueous solution, which comprises: supersaturating a given aqueous solution with a hydrate-forming gas at a relatively high pressure to form a hydrate; and releasing the pressure on said given aqueous solution containing said hydrate to cause direct refrigeration by means of the heat of dissociation of said hydrate, and the expansion of said hydrate-forming gas, said refrigeration causing crystal growth.

13. A process for crystallizing and separating water from an aqueous salt solution, which comprises: passing an aqueous salt solution, containing a hydrate-forming gas, downwardly through a crystallizing zone at an ever decreasing velocity; crystallizing water-containing material from said aqueous salt solution by releasing said gas, crystals formed above a first predetermined mesh size rising upwardly, overcoming the aqueous salt solution velocity, to the top of said crystallizing zone; and entraining said crystals upwardly from the top of said crystallizing zone, by said released gas, in an elutriation section.

14. The process of claim 13 wherein wash water is passed downwardly in said elutriation section to wash said entrained crystals of occluded aqueous salt solution.

15. An ice crystallization apparatus, which comprises: a crystallizer body of inverted conical shape; inlet means, in the upper section of said crystallizer body for an aqueous solution from which crystallization is to take place; discharge means, in the lower section of said crystallizer body, for said solution; and discharge means for crystals, in the upper end of said crystallizer body.

16. A crystallization apparatus, which comprises: a crystallizer body of inverted conical shape; inlet means, in the upper section of said crystallizer body; outlet means, in the lower section of said crystallizer body; and a relatively small diameter elutriator section affixed to the upper end of said crystallizer body through which crystals above a certain size are discharged.

17. An ice melting apparatus, which comprises: an ice melter body of inverted conical shape and having an upper and a lower section; inlet means for ice in the upper section of said body; inlet means for relatively warm water in the upper section of said body; and discharge means for the melted ice and water in the bottom section of said body.

18. A process for removing water from a given aqueous solution, which comprises:
incrementally absorbing a hydrate-forming gas into said given aqueous solution at a series of successively higher pressures, to form a hydrate at a given temperature and pressure;
countercurrently, incrementally releasing said hydrate-forming gas at successively lower pressure stages to produce water-containing crystals, said successive releasing of said hydrate-forming gas causing refrigeration and super-saturation of said water-containing crystals; and
removing said water-containing crystals from the resulting solution.

19. The process of claim 18 wherein said successive absorption stages are isothermal, the heat of absorption being removed by external refrigeration.

20. A process for forming ice from a given aqueous salt solution, which comprises: saturating said given aqueous salt solution with hydrate-forming gas at a pressure substantially above 1 atmosphere; and depressurizing said saturated given aqueous salt solution in successively lower stages of pressure, said hydrate-forming gas released in each stage being absorbed, by additional aqueous salt solution, in successive stages at the pressure at which it is released.

21. The process of claim 20 wherein said hydrate-forming gas is carbon dioxide, and said given aqueous salt solution is a saline water.

22. The process of claim 20 wherein said given aqueous salt solution is neutralized at atmospheric pressure by means of flue gases prior to absorption of said hydrate-forming gas above 1 atmosphere.

23. The process of claim 20 wherein said hydrate-forming gas is carbon dioxide.

24. A process for removing water from a given aqueous solution, which comprises:
incrementally absorbing a hydrate-forming gas into said given aqueous solution at a series of successively higher pressures to form a hydrate at a given temperature and pressure;
countercurrently, incrementally releasing said hydrate-forming gas at successively lower pressure stages to produce water-containing crystals, said successive releasing of said hydrate-forming gas causing refrigeration and super-saturation of said water-containing crystals;
passing said given aqueous solution containing said water-containing crystals into an upper section of a crystallizing zone, said given aqueous solution containing said water-containing crystals moving downwardly therein at an ever-decreasing velocity, and said water-containing crystals growing above a first predetermined mesh size moving upwardly against said downward flowing aqueous solution; and
removing said water-containing crystals above said first predetermined mesh size from said crystallizing zone.

25. The process of claim 24 wherein said successive absorption stages are isothermal, the heat of absorption being removed by external coolants.

26. The process of claim 24 wherein mother liquor, saturated with said hydrate-forming gas, leaves said crystallizing zone, and passes in heat exchange relation with said given aqueous solution absorbing hydrate-forming gas to render the absorption isothermal, said hydrate-forming gas released by said mother liquor, at a given pressure, being absorbed, at this same pressure, by said given aqueous solution.

27. The process of claim 24 wherein said given aqueous solution, upon its absorption of a maximum amount of hydrate-forming gas at a pressure and temperature sufficient to cause solid hydrate formation, is passed directly into a classifying zone without any substantial decrease in pressure or increase in temperature, thereby to maintain said hydrate solid during classification.

28. The process of claim 27 wherein said hydrate crystals are removed from said classifier zone, and the endothermic heats of dissociation and vaporization of said hydrate crystals cool said given aqueous solution which is absorbing said dissociated hydrate-forming gas in a plurality of stages.

29. A process for freezing water from an aqueous solution, which comprises: saturating an aqueous solution with a hydrate-forming gas at a high pressure substantially above 1 atmosphere; depressurizing said saturated aqueous solution in successive stages of lower pressure above 1 atmosphere to achieve successive refrigeration effects in each successive depressurizing stage; finally depressurizing said previously depressurized aqueous solution to about 1 atmosphere in a crystallizer zone whereby to crystallize ice crystals; and removing ice crystals from said crystallizer zone.

30. A process for crystallizing and separating water from a given aqueous solution, which comprises: successively incrementally absorbing a hydrate-forming gas into a given aqueous solution, under successively higher pressures; successively incrementally releasing said hydrate-forming gas in said given aqueous solution causing successive cooling and supersaturation of said given aqueous solution containing decreasing amounts of said hydrate with water-containing crystals, the hydrate-forming gas incrementally released being absorbed incrementally by additional aqueous solution; passing said supersaturated aqueous solution downwardly through a crystallizing zone; further releasing said hydrate-forming gas from said supersaturated aqueous solution in said crystallizing zone to further cool and supersaturate said supersaturated solution, and cause growth of ice crystals therein, ice crystals formed above a first predetermined mesh size moving upwardly against the resulting downwardly flowing supersaturated aqueous solution; removing said ice crystals, formed above said first predetermined mesh size; and recycling the resulting concentrated aqueous solution, containing ice crystals below a second predetermined mesh size the latter being smaller than the first predetermined mesh size for absorption of additional hydrate-forming gas.

31. A plant for removing water from an aqueous solution, which comprises: means for absorbing a hydrate-forming gas into a given aqueous solution at a series of successively higher pressures and for countercurrently releasing said hydrate-forming gas from said given aqueous solution containing said hydrate-forming gas at a series of successively lower pressures, to thereby cause refrigeration and supersaturation of water-containing crystals in said given aqueous solution containing said hydrate-forming gas; and means for transferring said supersaturated aqueous solution containing crystals to an inverted cone classifier for separation of said crystals from said supersaturated aqueous solution.

32. The plant of claim 31 wherein said means for absorbing said hydrate-forming gas is isothermal.

References Cited

UNITED STATES PATENTS

| | | | |
|---|---|---|---|
| 1,546,669 | 7/1925 | Monti | 62—123 |
| 2,649,166 | 8/1953 | Porter et al. | 55—44 |
| 2,821,304 | 1/1958 | Zarchin | 62—58 |
| 2,956,414 | 10/1960 | Steinbacher et al. | 62—123 |
| 2,974,102 | 3/1961 | Williams | 210—59 |
| 2,997,856 | 8/1961 | Pike | 210—59 |
| 3,027,320 | 3/1962 | Buchanan | 210—59 |

MORRIS O. WOLK, *Primary Examiner.*

S. MARANTZ, E. G. WHITBY, *Assistant Examiners.*